Patented Dec. 13, 1927.

1,652,874

UNITED STATES PATENT OFFICE.

ROBERT W. POINDEXTER, JR., OF LOS ANGELES, CALIFORNIA, ASSIGNOR TO CALIFORNIA CYANIDE COMPANY, INCORPORATED, OF NEW YORK, N. Y., A CORPORATION OF DELAWARE.

PREPARATION OF CALCIUM CYANIDE.

No Drawing. Original application filed April 13, 1926, Serial No. 101,832. Divided and this application filed February 5, 1927. Serial No. 166,269.

This case is a division of application Serial No. 101,832, filed April 13, 1926.

This invention relates to a process of producing normal calcium cyanide and to the product thereof. This product is a dry solid material which is adapted for a variety of uses and is particularly available as a source of hydrocyanic acid because it decomposes readily when exposed to a moist atmosphere.

Chemical literature contains numerous statements to the effect that calcium cyanide cannot be prepared in a solid and substantially pure form. Calcium cyanide can be prepared in solution by adding hydrocyanic acid to a suspension of calcium hydroxide but the cyanide decomposes when such solutions are evaporated. It has been discovered recently by Metzger that calcium cyanide having combined hydrocyanic acid can be produced by subjecting calcium carbide to the action of hydrocyanic acid. I have described in a Patent No. 1,596,120 a method of preparing calcium cyanide containing combined ammonia. The product of the process described herein differs from the products mentioned in that it contains no appreciable amount of combined hydrocyanic acid or ammonia. It is substantially the normal calcium cyanide $Ca(CN)_2$. The product is similar in many respects to the calcium cyanide products containing combined hydrocyanic acid or ammonia. It is, however, a distinct chemical compound and consequently some of its properties are different from those of the earlier products.

It is the object of the present invention to provide a process of preparing a dry substantially pure and solid cyanide of calcium and a product having substantially the composition indicated by the formula $Ca(CN)_2$.

Other objects and advantages of the invention will be apparent as it is better understood by reference to the following specification.

In carrying out the invention I follow preferably the procedure as indicated in my copending application above identified for the production of calcium cyanide with combined ammonia. I have discovered that when the product of this process is heated under regulated conditions the ammonia can be substantially removed from the compound, leaving calcium cyanide as the product. In order to secure the desired result the calcium cyanide containing combined ammonia should be reasonably pure and as free as possible from water. It should be free also from calcium nitrate or other calcium salts which have been used in the preparation of the ammonia-containing cyanide. Freedom from water can be attained by the use of substantially anhydrous liquid ammonia in the preparation of the ammonia-containing cyanide. That product can be freed from deleterious salts by sufficient washing with anhydrous liquid ammonia.

The separation of the ammonia from the ammonia-containing cyanide is accomplished by heating the cyanide in a partial vacuum to a temperature which should not exceed 325° C. The vacuum is used to avoid the contact of air and particularly moisture with the material since it decomposes readily in the presence of moisture and to facilitate the removal of the evolved ammonia. The treatment should be continued until substantially all of the ammonia has been removed. The product, which is pure calcium cyanide in a dry and solid form, should then be promptly sealed in suitable packages to prevent access of the atmosphere and moisture thereto.

The preparation of the ammonia-containing cyanide can be conducted in various ways. As indicated in the application above referred to, the preferred process is to dissolve a suitable salt of calcium such as calcium nitrate in anhydrous liquid ammonia. To this may be added either hydrocyanic acid or a solution of ammonium cyanide in anhydrous liquid ammonia. Any other cyanide which is soluble in the liquid ammonia can be substituted for ammonium cyanide or hydrocyanic acid. When hydrocyanic acid is added to anhydrous liquid ammonia or to a solution of a suitable salt in the liquid ammonia, ammonium cyanide is formed apparently and may be considered as the reacting cyanogen salt. The operation may be conducted satisfactorily by preparing two solutions, one consisting of the calcium salt dissolved in anhydrous liquid ammonia and the other consisting of anhydrous liquid ammonia to which hydrocyanic acid has been added. When the two solutions are combined a double decomposition occurs and a precipitate is formed. The precipitate can be filtered from the solution. It should be washed thoroughly with anhydrous liquid ammonia to remove all traces of other calcium salts.

It is not essential that the ammonia used as a solvent be strictly anhydrous as I have experienced no difficulty in using ammonia which contained a small amount of water. Likewise, it is possible to employ calcium salts which contain water of crystallization. This water is liberated during the reaction but it does not interfere with the production of the cyanide. As hereinbefore indicated, however, the amount of water should be reduced to a minimum and water should be absent preferably if the ammonia-containing cyanide is to be subjected to further treatment for the removal of the ammonia.

In carrying out the process the acid radical of the salt used combines with ammonia in the mother liquor. Thus, if calcium nitrate is used the liquor contains ammonium nitrate. The liquor can be evaporated to recover the free ammonia and to deposit the ammonium salt, for example, ammonium nitrate. This salt can be utilized as a by-product for fertilizing or other uses. It can be decomposed also by the addition of calcium oxide or hydroxide to regenerate the ammonia and the calcium salt, for example, calcium nitrate. Both of these products can be returned to the process, thus providing a cyclic operation in which all of the materials entering the reaction are withdrawn either as the cyanide product or reused to generate that product.

To obtain the calcium cyanide substantially free from ammonia the ammonia-containing cyanide having the composition, for example, $Ca(CN)_2.2NH_3$ should be subjected in a suitable closed receptacle to a partial vacuum produced by a vacuum pump and heated at the same time until the ammonia is evolved freely. The heating should be carefully controlled so that it does not at any time exceed 325° C. and should be continued until substantially all of the ammonia has been separated. The end point can be determined by analysis of samples taken from time to time. When the separation is complete the cyanide should be cooled and placed promptly in suitable sealed receptacles.

Any convenient form of apparatus may be employed in carrying out the operation. For example, a vacuum shelf dryer of any type may be employed if means for heating the shelves to the requisite temperature is available. It is important in carrying out the operation that air be excluded because of the tendency of the material to decompose particularly in the presence of moist air. Consequently the cyanide precipitate containing ammonia should be transferred as promptly as possible to the drier in which the removal of ammonia is accomplished.

As an example of the application of the process, I place about 150 c.c. of commercial anhydrous liquid ammonia in a Dewar test tube and added 25 c.c of hydrocyanic acid, thus forming a solution of ammonium cyanide. In another Dewar test tube 10 grams of calcium nitrate $Ca(NO_3)_2.4H_2O$ were dissolved in about 100 c.c. of commercial anhydrous liquid ammonia. The ammonium cyanide solution was then added to the calcium nitrate solution until precipitation ceased. The precipitate was filtered with the aid of suction and washed with 50 c.c. of anhydrous liquid ammonia. The precipitate was then placed in a 150 c.c. Erlenmeyer flask and heated under 28 inches of vacuum to a temperature somewhat below 325° C. The drying temperature was controlled by supporting the flask in an air bath.

Several batches of the product were made in the manner indicated and three of them showed the following analyses:

| Batch No. | Ca | CN | NH₃ |
| --- | --- | --- | --- |
|  | Per cent | Per cent | Per cent |
| 1 | 42.8 | 52.4 | 0.9 |
| 2 | 45.3 | 52.0 | 0.1 |
| 3 | 47.0 | 52.1 | 0.0 |

These analyses indicate that the product approximates normal calcium cyanide $Ca(CN)_2$ but that a relatively small amount of cyanogen has been evolved with the ammonia resulting in the production of a slightly basic salt. Better control of the conditions during the removal of the ammonia will undoubtedly permit the production of a strictly normal salt.

The product is very soluble in water, forming a faintly yellow solution. There is a small amount of insoluble lime in the solution which probably represents the excess of lime from which the cyanogen has been evolved. The compound is moderately soluble in methyl alcohol but after a certain concentration is reached the material is decomposed with precipitation of calcium hydroxide.

When the product is exposed to the atmosphere hydrocyanic acid is readily evolved. If ignited the hydrocyanic acid burns with considerable volume of flame. The following table shows the result of an evolution test made on layers one-eighth of an inch in depth:

| Exposure period | CN loss | Color |
| --- | --- | --- |
|  | Per cent |  |
| 1 hr | 45.7 | No change. |
| 2 hr | 74.6 | No change. |
| 4 hr | 94.8 | No change. |

Temperature—65° F.
Relative humidity—80%.

The material when pure is nearly white and when kept from the atmosphere the color does not change appreciably. It is a very finely divided light powder. It loses very little of its cyanogen by decomposition unless exposed to the atmosphere. After three weeks the color of the compound became a very light yellow but the change was not distinguishable except by a comparison of a sample with freshly prepared material. The fact that the color did not alter after exposure to the atmosphere together with the fact that the alkaline solutions of the evolution test residues were practically colorless when filtered indicates that substantially all of the contained cyanogen is available as HCN and very little if any is polymerized. The hydrocyanic acid polymer is soluble in alkaline solutions and a very small percentage will discolor the solution to a very considerable extent.

From the foregoing it appears that I have produced as a new product calcium cyanide in a substantially pure and solid form and I have devised a simple and relatively inexpensive process for the manufacture of this product. While I prefer to prepare the ammonia-containing cyanide from which the ammonia is removed by the process of my copending application I can, of course, produce the normal calcium cyanide by removing ammonia from ammonia-containing cyanide prepared in any suitable way. The invention is based, therefore, upon the discovery that the ammonia-containing cyanide can be freed from combined ammonia without decomposition of the cyanide.

Various changes may be made in the details of operation of the process and in the apparatus employed in connection therewith without departing from the invention or sacrificing any of the advantages thereof.

I claim:—

1. The process of producing normal calcium cyanide, which comprises heating a calcium cyanide compound containing combined ammonia until the product is substantially free from ammonia.

2. The process of producing normal calcium cyanide, which comprises heating a calcium cyanide compound containing combined ammonia under partial vacuum until the product is substantially free from ammonia.

3. The process of producing normal calcium cyanide, which comprises heating a calcium cyanide compound containing combined ammonia at a temperature not exceeding 325° C. until the product is substantially free from ammonia.

4. The process of producing normal calcium cyanide, which comprises heating a calcium cyanide compound containing combined ammonia under partial vacuum at a temperature not exceeding 325° C. until the product is substantially free from ammonia.

5. The process of producing normal calcium cyanide, which comprises heating a compound having the formula $Ca(CN)_2.yNH_3$ until the product is substantially free from ammonia.

6. The process of producing normal calcium cyanide, which comprises forming a calcium cyanide compound containing combined ammonia by substitution of the cyanogen radical for the acid radical of a calcium compound in a solution of anhydrous liquid ammonia, separating the precipitated cyanide and heating it until substantially all of the ammonia is removed therefrom.

7. The process of producing normal calcium cyanide, which comprises forming a calcium cyanide compound containing combined ammonia by substitution of the cyanogen radical for the acid radical of a calcium compound in a solution of anhydrous liquid ammonia, separating the precipitated cyanide and heating it under partial vacuum until substantially all of the ammonia is removed therefrom.

In testimony whereof I affix my signature.

ROBERT W. POINDEXTER, Jr.